(12) United States Patent  
Scott

(10) Patent No.: US 8,289,193 B2  
(45) Date of Patent: Oct. 16, 2012

(54) MOBILE WIRELESS COMMUNICATIONS DEVICE PROVIDING ENHANCED PREDICTIVE WORD ENTRY AND RELATED METHODS

(75) Inventor: Sherryl Lee Lorraine Scott, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 957 days.

(21) Appl. No.: 11/849,003

(22) Filed: Aug. 31, 2007

(65) Prior Publication Data

US 2009/0058690 A1    Mar. 5, 2009

(51) Int. Cl.
- *H03K 17/94* (2006.01)
- *H03M 11/00* (2006.01)
- *G06F 3/048* (2006.01)
- *G06F 3/02* (2006.01)
- *G09G 5/00* (2006.01)

(52) U.S. Cl. ............ 341/23; 715/780; 715/856; 345/171

(58) Field of Classification Search .................... 341/23, 341/22; 348/28, 734; 178/18.01; 715/784, 715/856; 345/157, 168, 173; 400/486; 708/138, 708/142; 379/367, 368, 369

See application file for complete search history.

(56) References Cited

U.S. PATENT DOCUMENTS

| | | | |
|---|---|---|---|
| 2006/0063558 A1* | 3/2006 | Scott | 455/550.1 |
| 2006/0095843 A1* | 5/2006 | Chou | 715/535 |
| 2007/0052868 A1* | 3/2007 | Chou et al. | 348/734 |
| 2007/0236450 A1* | 10/2007 | Colgate et al. | 345/156 |
| 2008/0007433 A1* | 1/2008 | Fux et al. | 341/20 |
| 2008/0010054 A1* | 1/2008 | Fux | 704/1 |

* cited by examiner

*Primary Examiner* — Albert Wong  
*Assistant Examiner* — Jerold Murphy  
(74) *Attorney, Agent, or Firm* — Finnegan, Henderson, Farabow, Garrett & Dunner, LLP

(57) ABSTRACT

A mobile wireless communications device may include a portable, handheld housing, and a display and keyboard carried by the portable, handheld housing. The keyboard may include a plurality of multi-symbol keys each having indicia of a plurality of respective symbols thereon, and a predetermined multi-symbol key may have a comma/apostrophe symbol and at least one other symbol thereon. A controller may be used for generating, in response to an ambiguous input including an ambiguous punctuations input, a menu of possible desired words including at least one word with a comma and at least one word with an apostrophe and at least one other character additional to the ambiguous input. The device further includes a multiple-axis input device that is operable to provide movement inputs to move to, for example, a variant output and is further operable to provide a selection input as to, for example, the variant output.

14 Claims, 11 Drawing Sheets

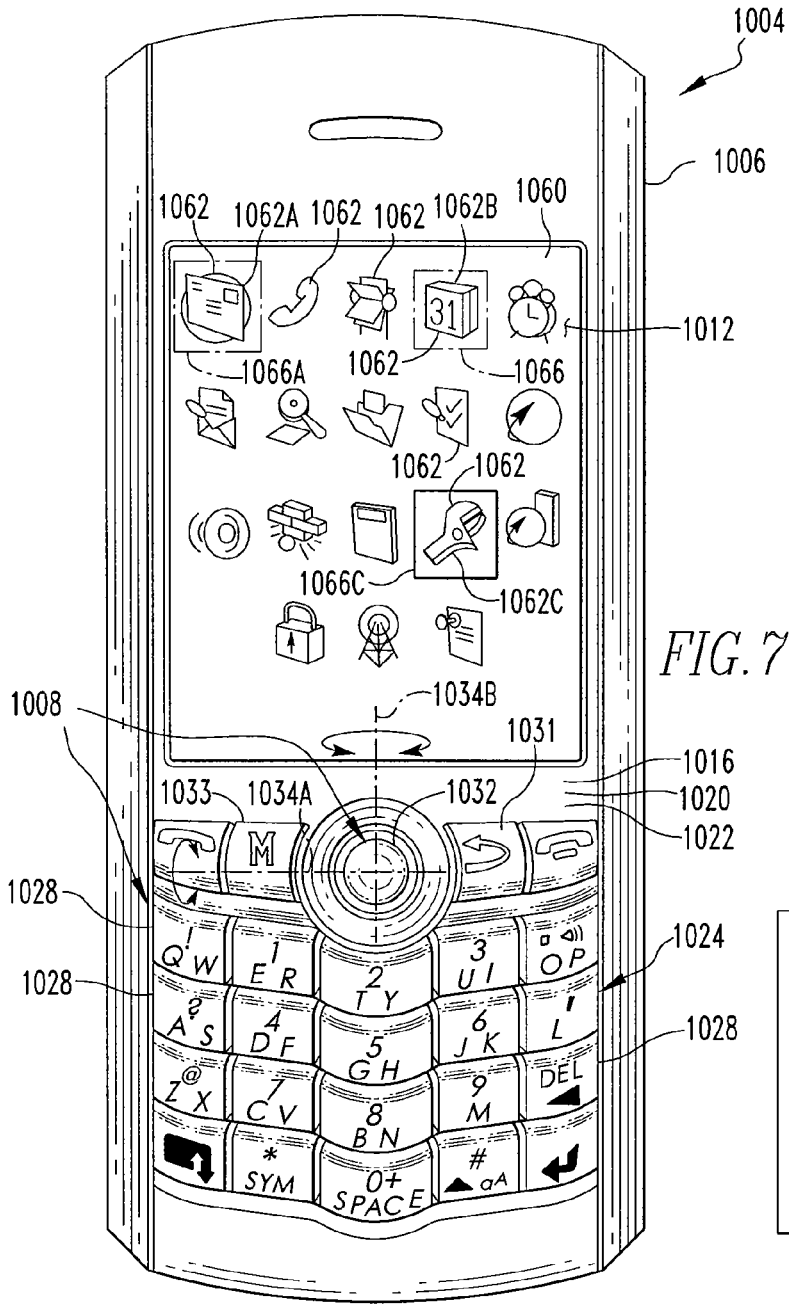
FIG. 7
FIG. 8
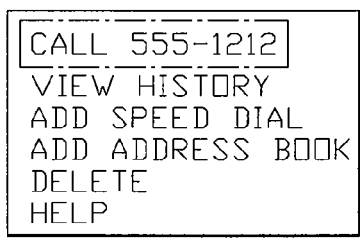
FIG. 9
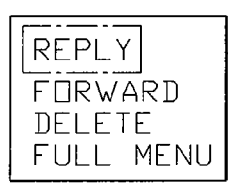
FIG. 10

MOBILE WIRELESS COMMUNICATIONS DEVICE PROVIDING ENHANCED PREDICTIVE WORD ENTRY AND RELATED METHODS

FIELD

The disclosed and claimed concept relates to the field of communications devices, and, more particularly, to mobile wireless communications devices and related methods.

BACKGROUND

Cellular communications systems continue to grow in popularity and have become an integral part of both personal and business communications. Cellular phones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network.

Even so, as the functionality of cellular communications devices continues to increase, so too does the demand for smaller devices which are easier for users to carry. As a result, some cellular communications devices which also provide email or text messaging features do not have enough space to provide a full keypad with all of the traditional QWERTY keys. As a result, such devices typically utilize shared or multi-symbol keys, some of which are used to enter multiple letters, numbers, and/or punctuation symbols, for example. Of course, this makes it more challenging for users to enter desired symbols, as pressing a multi-symbol key may cause the device to display one of the other symbols shared by that key instead of the desired symbol.

Various approaches are therefore used to facilitate typing with multi-symbol keys. One approach is to enable multi-tap typing, where pressing a key a certain number of times enters the corresponding symbol on the key (e.g., pressing a key twice enters the second symbol on the key). While this makes it easier for a user to select the desired symbol, it may still be somewhat cumbersome in that it may require a user to press the keys many times to type relatively few letters.

Another approach to facilitate word entry with multi-symbol keys is predictive word entry. That is, a software module run by the wireless device's processor attempts to predict the particular word or phrase the user is trying to type based upon the combination of keys that are pressed or actuated. An example of a cellular telephone device including a predictive text editor application is disclosed in U.S. Pat. No. 6,542,170 to Williams et al. This device includes a display, a keypad having a plurality of keys each associated with several letters, and a processor controlling the display in accordance with the operation of the keypad. The processor runs a predictive editor program for generating an output including a word matching a received string of ambiguous key strokes. While the predictive editor program is active, pressing the "1" key on the phone will allow a "smart" insertion of punctuation. That is, the predictive editor program tries to predict, based on the situation, which commonly used punctuation mark is intended. These may include the period, comma, question mark, exclamation point, and apostrophe. The default value will most often suggest a period, if no other matches seem appropriate. A match function is performed by pressing the "*" key, which allows the user to toggle through a list of symbol choices which may include a period, comma, etc. Despite the advantages provided by such devices, further predictive typing/editing functionality may be desirable in certain applications.

BRIEF DESCRIPTION OF THE DRAWINGS

A full understanding of the disclosed and claimed concept can be gained from the following Description when read in conjunction with the accompanying drawings in which:

FIG. 7 is a top plan view of an improved handheld electronic device in accordance with another embodiment of the disclosed and claimed concept;

FIG. 8 depicts an exemplary menu that can be output on the handheld electronic device of FIG. 7;

FIG. 9 depicts another exemplary menu;

FIG. 10 depicts an exemplary reduced menu;

DESCRIPTION

Figure 1:
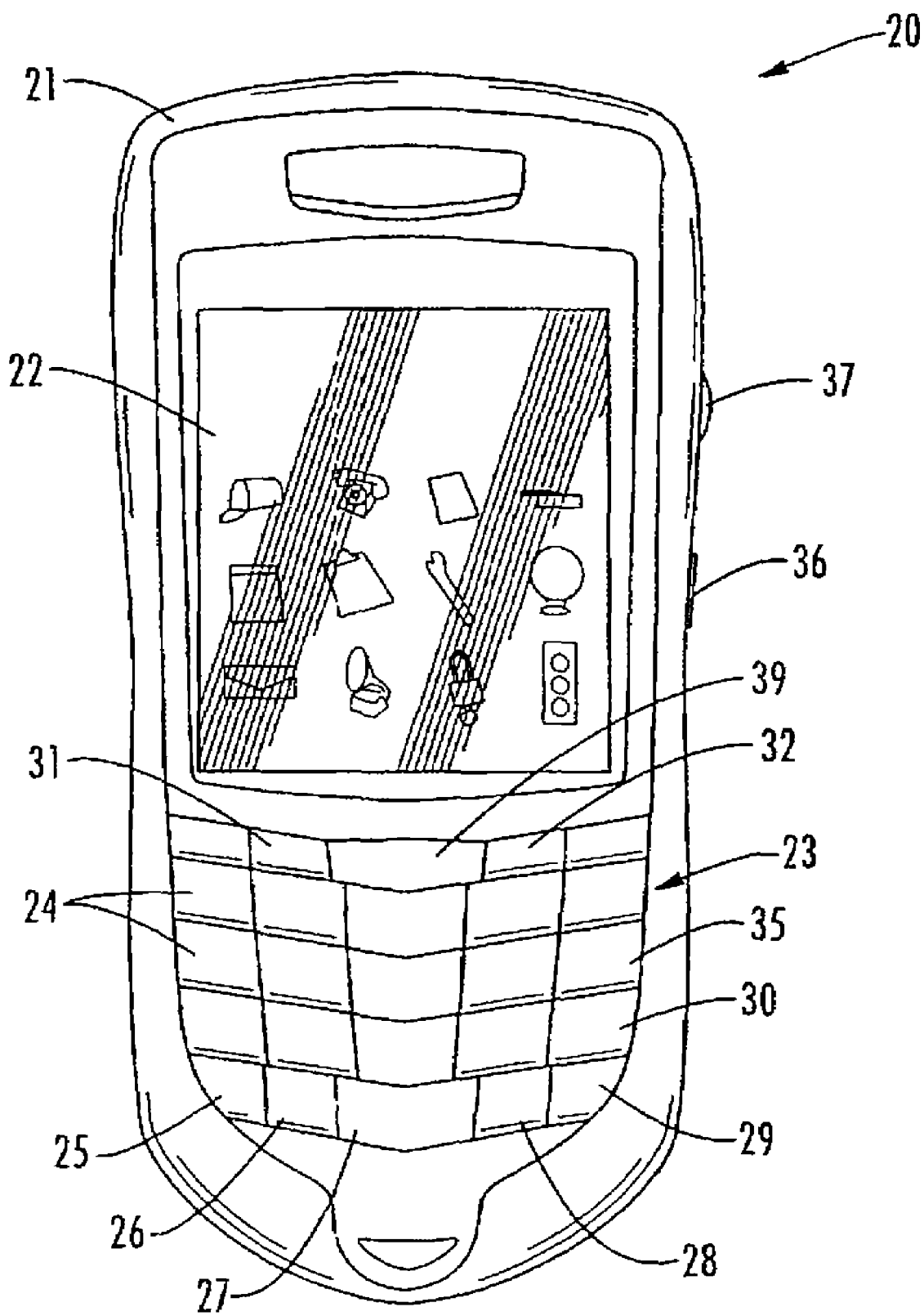
FIG. 1 is a front elevational view of a mobile wireless communications device in accordance with the disclosed and claimed concept.
Figure 2:
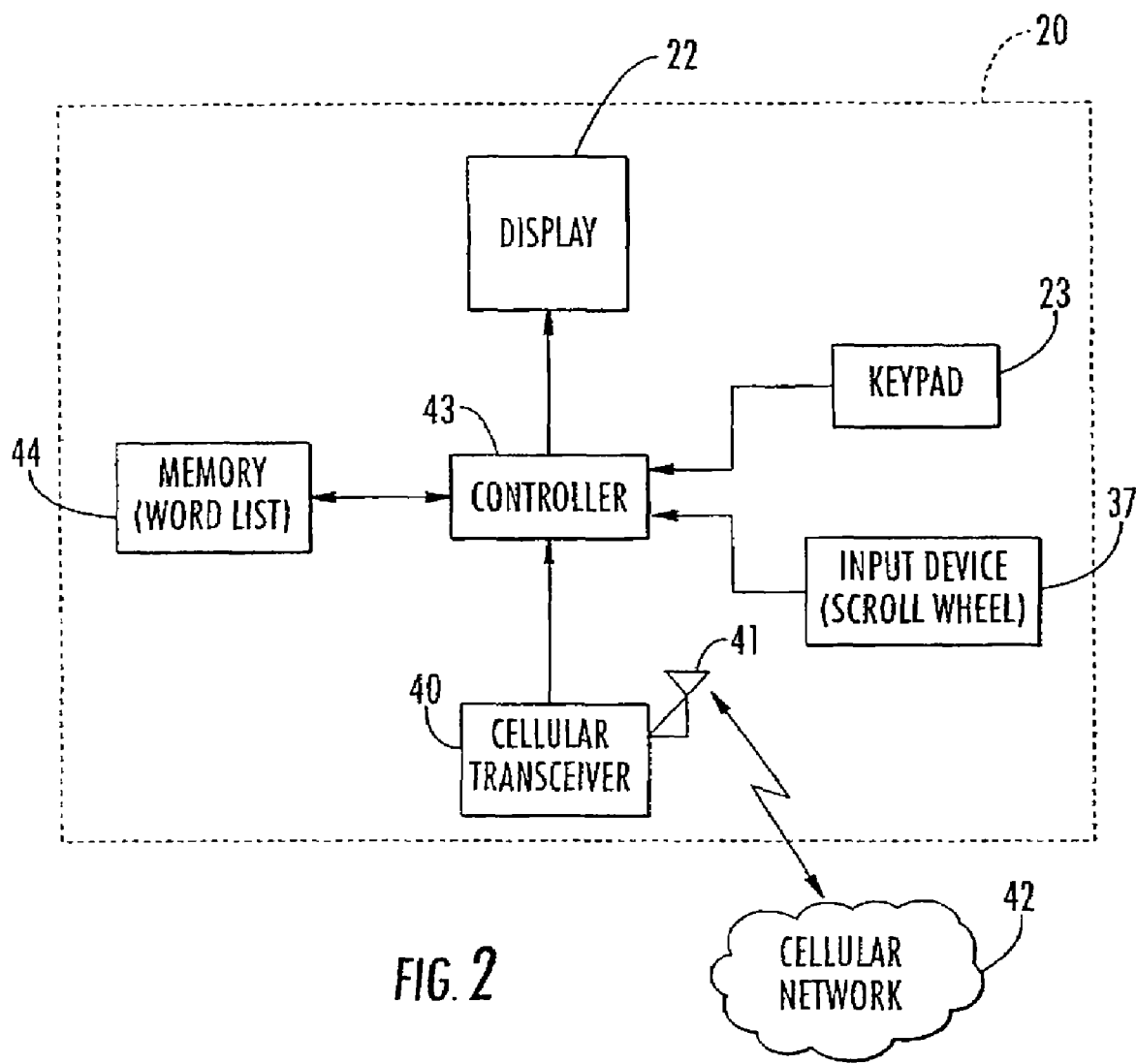
FIG. 2 is schematic block diagram of the mobile wireless communications device of FIG. 1.

An improved mobile wireless communications device 20 is indicated generally in FIG. 1 and is depicted schematically in FIG. 2. The exemplary device 20 is a mobile cellular communications device which includes a cellular transceiver 40 and associated antenna 41 for communicating over a cellular network 42. In particular, the cellular transceiver 40 may be used for cellular telephone calls as with traditional cellular telephones, and it also preferably cooperates with a controller 43 for sending other data, such as email/Internet data, over the cellular network 42 as well, as will be appreciated by those skilled in the art.

The device 20 illustratively includes a portable, handheld housing 21, and a display 22 and keyboard 23 carried by the housing. A back button 36 and a scroll wheel 37 are also carried by the housing 21 and are connected to the controller 43 for allowing a user to navigate menus, text, etc., as will be appreciated by those skilled in the art. The scroll wheel 37 may also be referred to as a "thumb wheel" or a "track wheel" in some instances. The keyboard 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 1, the multi-symbol keys 24 are arranged in the first three rows on the keypad 23 below the off-hook and on-hook keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keyboard.

The keys (including the fourth row of function keys 25-29) are arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

As discussed briefly above, the reason that more than one letter appears on most of the keys 24 is so that less than a full set of QWERTY keys, as found on a traditional computer/typewriter keyboard, can be used to access all of the English alphabet letters. This advantageously allows the footprint of the keypad 23 to remain relatively small which, in turn, allows the overall size of the mobile wireless communications device 20 to be decreased as well.

Yet, as also mentioned above, the tradeoff with placing multiple symbols on a single key is that typing (e.g., typing emails) becomes more difficult for users. To make typing easier, the controller 43 preferably allows symbols/text to be entered in two different modes, namely a multi-tap mode and a predictive mode. In the multi-tap mode, a user enters a desired symbol by pressing a given key a number of times corresponding to its position on the key. Thus, for example, for a user to enter a "W." she would press the QW/! key twice. To enter an exclamation point, the user would press the alternate function key 25 before pressing the QW/! key.

Figure 3:
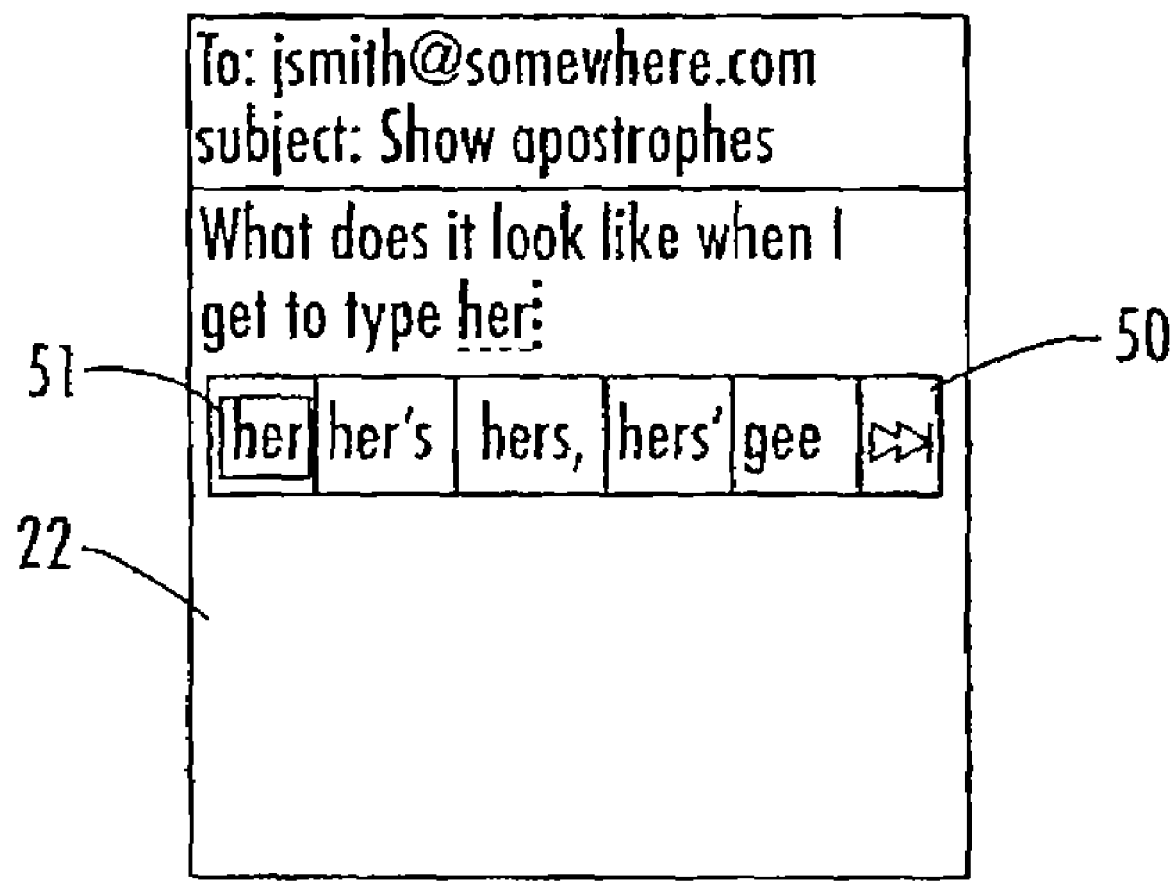
FIG. 3 is a screen print of the display of the mobile wireless communications device of FIG. 1 illustrating a menu of possible desired words including both at least one choices having a comma and at least one choice having both an apostrophe and at least one additional character.

Referring more particularly to FIG. 3, in a predictive mode, the controller 43 compares respective symbols corresponding to actuated multi-symbol keys 24 to a list (i.e., dictionary) of words and/or phrases, which is stored in a memory 44. The controller 43 generates a menu 50 of possible desired words based upon the combination of keys 24 that are pressed, as will be appreciated by those skilled in the art. The possible desired words may be generated according to various rules, such as a general frequency of use of the words, a frequency of use of the words by the user, alphabetically, etc., or a combination thereof.

Furthermore, the controller then generates a cursor 51 on the display 22 which highlights different possible desired words in the menu 50 based upon the scroll wheel 37. One of the words will be output as a default output, i.e., a preferred output, and the cursor 51 will initially highlight the default output. The other possible words will be output as variant outputs that can be selected by scrolling with the scroll wheel 37. That is, the cursor 51 can be moved back and forth through the menu 50 to highlight the various words therein for selection by the user. The user can select a given word by pressing the scroll wheel 37 inward, or by pressing the return key 29, for example. Once a desired word is selected, the controller 43 finalizes the word and inserts the finalized selected word in the active document (e.g., an email, notepad document, etc.), and the process begins again when the user starts entering symbols for a next word.

To provide further space savings on the keypad 23, a predetermined multi-symbol key 35 shares the "L" symbol and a comma/apostrophe symbol. Of course, the comma/apostrophe symbol could be located on another key in other embodiments. By "comma/apostrophe symbol" it is meant that the respective symbols used to represent commas and apostrophes are very similar in appearance, and therefore the two are generally ambiguous unless they are positioned relative to a letter. That is, seeing a comma/apostrophe symbol in isolation would not likely allow someone to discern which symbol was intended unless the symbol was positioned adjacent the bottom of a line of text as a comma, or adjacent the top of the line as an apostrophe.

Thus, because the keypad 23 has only a single comma/apostrophe symbol on the key 35, it is possible that a user typing on the keypad might mistakenly press this key thinking it is an apostrophe when it is in fact a comma, or vice-versa. In the current exemplary embodiment, both the comma and the apostrophe punctuation symbols are assigned to this key, and an actuation of the key therefore results in an ambiguous punctuation input. In the exemplary embodiment, the key 35 causes a comma to be generated in the multi-tap mode when the alternate function key 25 is first pressed, although an apostrophe may instead be provided in other embodiments. It should be noted that an apostrophe (as well as other symbols) may be selected through a separate symbol screen (not shown), which the controller 43 generates upon pressing the alternate function key 25 followed by the ZX/SYM key.

When in the predictive mode, the controller 43 advantageously generates the menu 51 of possible desired words to include at least one word with a comma, and at least one word with both an apostrophe and an additional character based upon activation of the comma/apostrophe key 35. In the example illustrated in FIG. 3, for the current word being typed by a user (as indicated with dashed underlining, in this case the keys corresponding to the characters "h", "e", and "r") the controller 43 displays the letters h, e, and r. The user then presses the comma/apostrophe key 35, which causes the controller 43 to recognize several possible desired words, which in this example, one of which includes a comma ("hers,") in addition to the predictive character "s" which proceeds the comma. Two of the generated word choices have apostrophes ("her's" and "hers'") in addition to the predictive character "s". Of course, the controller 43 may determine that other words without a comma/apostrophe are also possible desired words, such as "her" and "gee" as shown in the present example.

Accordingly, even though the comma/apostrophe symbol may be ambiguous to users, only a single multi-symbol key with a comma/apostrophe symbol need be included in the keypad 23 because users will advantageously be provided with choices of possible desired words including both commas and apostrophes and at least one additional, i.e., untyped, character upon pressing this key when the controller 43 is in a predictive mode. As a result, the number of keys on the keypad 23 is reduced, while still allowing a relatively quick predictive determination of the user's desired word or phrase. Additionally, the additional untyped characters allow a user to select from the generated menu a completed word containing, for example an apostrophe, without having to enter any additional characters beyond activation of the ambiguous comma/apostrophe key 35. Thus the present concept provides the user not only with a feature that enables resolution of an ambiguity in an input but also with a feature whereby provided in the menu is at least one completed word choice comprising an untyped additional letter.

Figure 4:
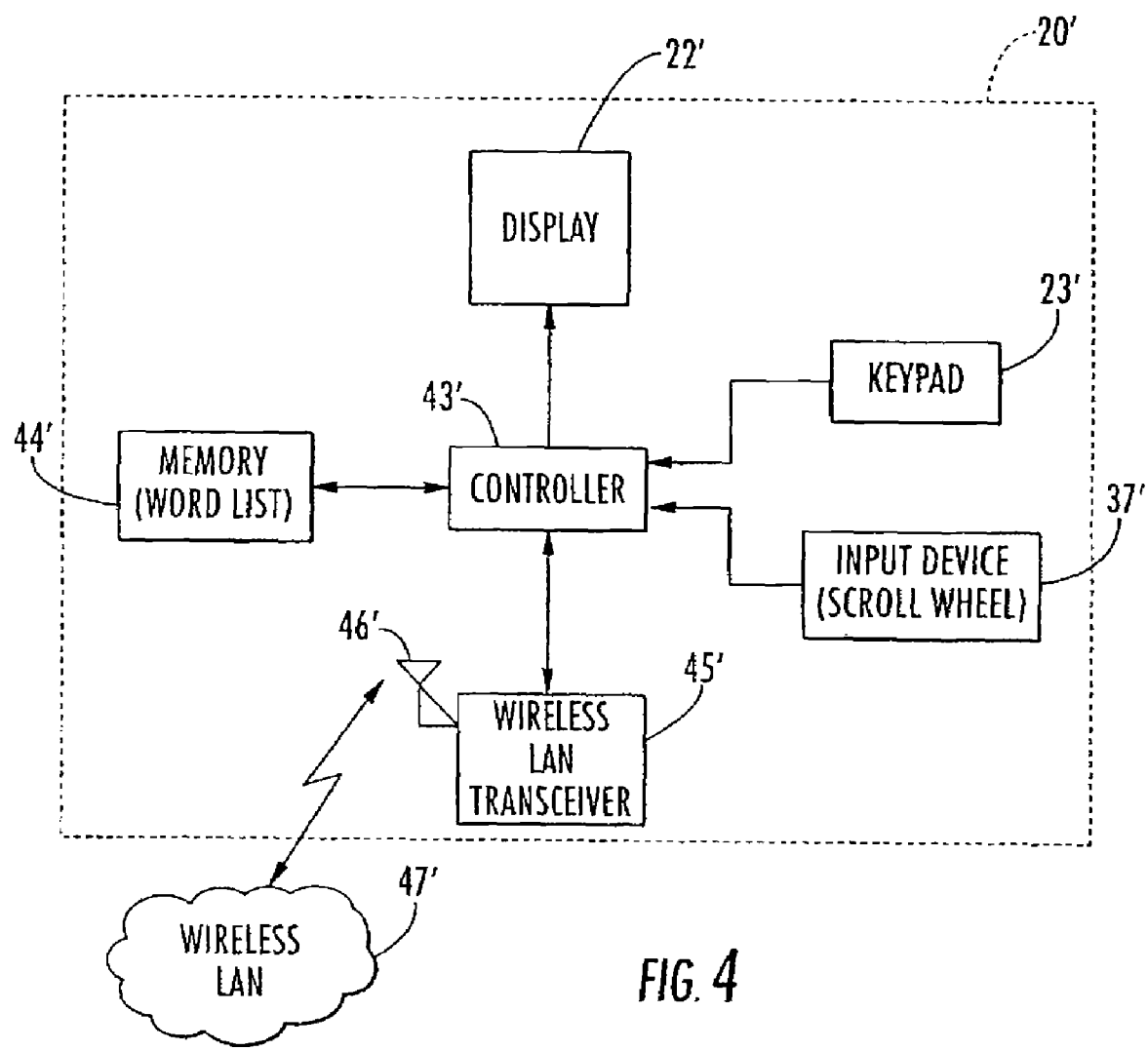
FIG. 4 is a schematic block diagram of an alternate embodiment of the mobile wireless communications device of FIG. 1.

Turning additionally to FIG. 4, the mobile wireless communications device 20' may optionally include a wireless transceiver 45', such as a wireless local area network (LAN) (e.g., IEEE802.11/Bluetooth) transceiver, and associated antenna 46' carried by the portable, handheld housing. The controller 43' cooperates with the wireless transceiver 45' to communicate information, such as voice, email, or Internet data, over a wireless personal or local area network 47', as will be appreciated by those skilled in the art. In other embodiments, both the wireless LAN transceiver 45' and the cellular transceiver 40 (or another type of wireless transceiver) of FIG. 2 may be included in the same device, as will be appreciated by those skilled in the art.

Figure 5:
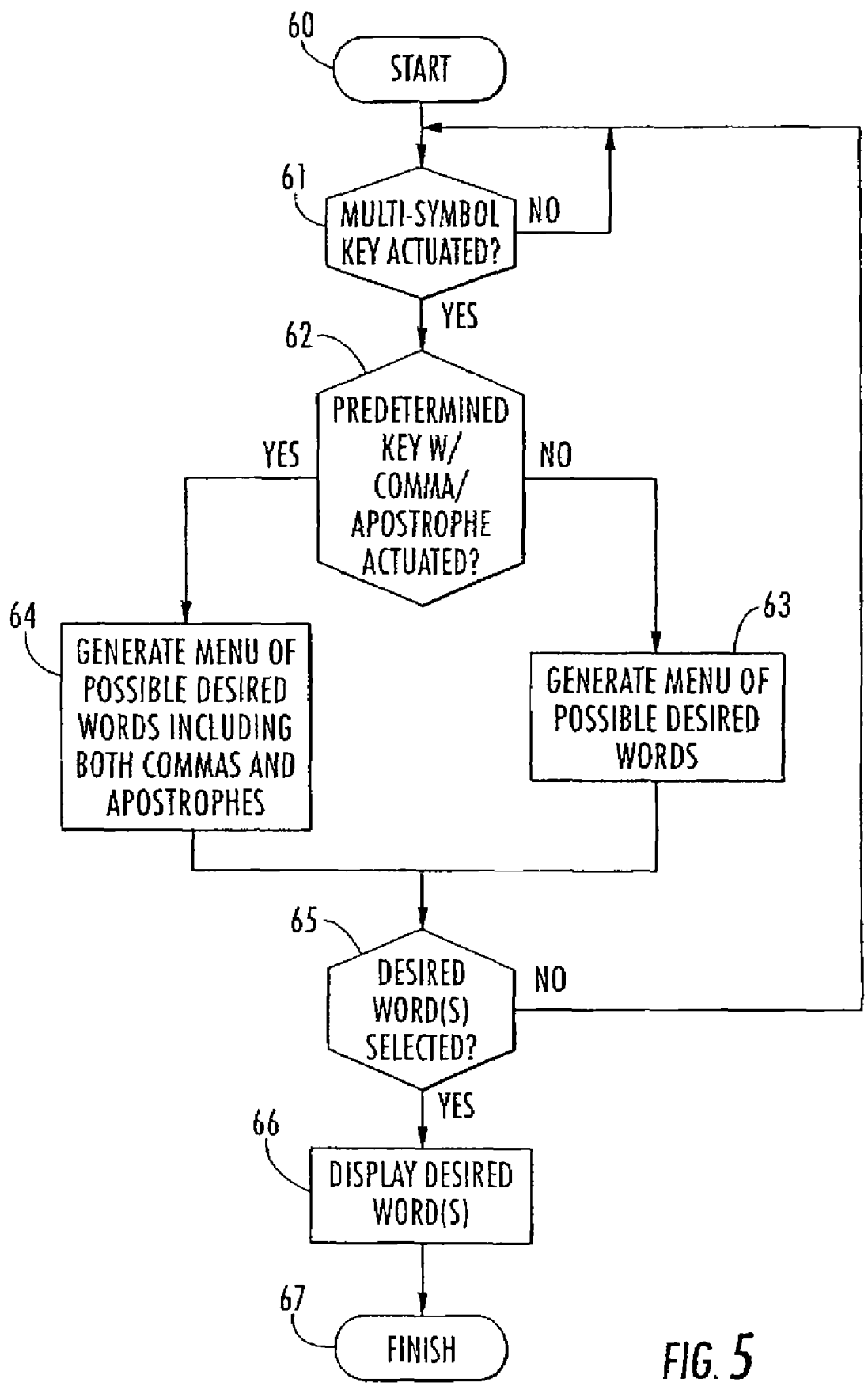
FIG. 5 is a flow diagram illustrating a mobile wireless communications method in accordance with the disclosed and claimed concept.

A method for using the mobile wireless communications device 20 in accordance with the invention is now described with reference to FIG. 5. The method begins (Block 60) with detecting actuation of multi-symbol keys 24, at Block 61, and, more particularly, whether the comma/apostrophe key 35 has been actuated to enter a comma/apostrophe (i.e., by first pressing the alternate function key 25), at Block 62. If a comma/apostrophe is not entered, then the controller 43 compares the respective symbols associated with the actuated keys 24 to the list of words to generate the menu 50 of possible desired words, at Block 63, as described above. If a comma/apostrophe is entered, then the controller 43 generates the menu 50 to include one or more possible desired words with a comma, and one or more possible desired words with an apostrophe, at Block 64, as further described above.

Once the user selects a desired possible word form the menu 50, at Block 65, the word is displayed on the display 22, at Block 66, thus concluding the illustrated method (Block 67). Of course, it will be appreciated that the above-described method would be repeated as the user continues entering further words. Moreover, if a desired word is not selected, the controller 43 will also return to the step illustrated at Block 61 as the user actuates additional keys.

The controller 43 may be implemented with a microprocessor and associated software modules to be executed thereby, as will be appreciated by those skilled in the art. Moreover, the keypad 32 need not include soft keys as illustrated in FIG. 1, but instead may include other types of keys as well, such as touch keys on a display, for example. It should also be noted that various other multi-symbol key configurations may be used other than the exemplary configuration shown, and a QWERTY layout need not be used in all embodiments. Similarly, other arrangements of numbers on the keypad 23 may be used as well.

Another example of a hand-held mobile wireless communications device 100 that may be used in accordance the present invention is further described in the example below with reference to FIG. 6. The device 100 includes a housing 200, a keyboard 400 and an output device 600. The output device shown is a display 600, which is preferably a full graphic LCD. Other types of output devices may alternatively be utilized. A processing device 800 is contained within the housing 200 and is coupled between the keyboard 400 and the display 600. The processing device 800 controls the operation of the display 600, as well as the overall operation of the mobile device 100, in response to actuation of keys on the keyboard 400 by the user.

The housing 200 may be elongated vertically, or may take on other sizes and shapes (including clamshell housing structures). The keyboard may include a mode selection key, or other hardware or software for switching between text entry and telephony entry.

Figure 6:
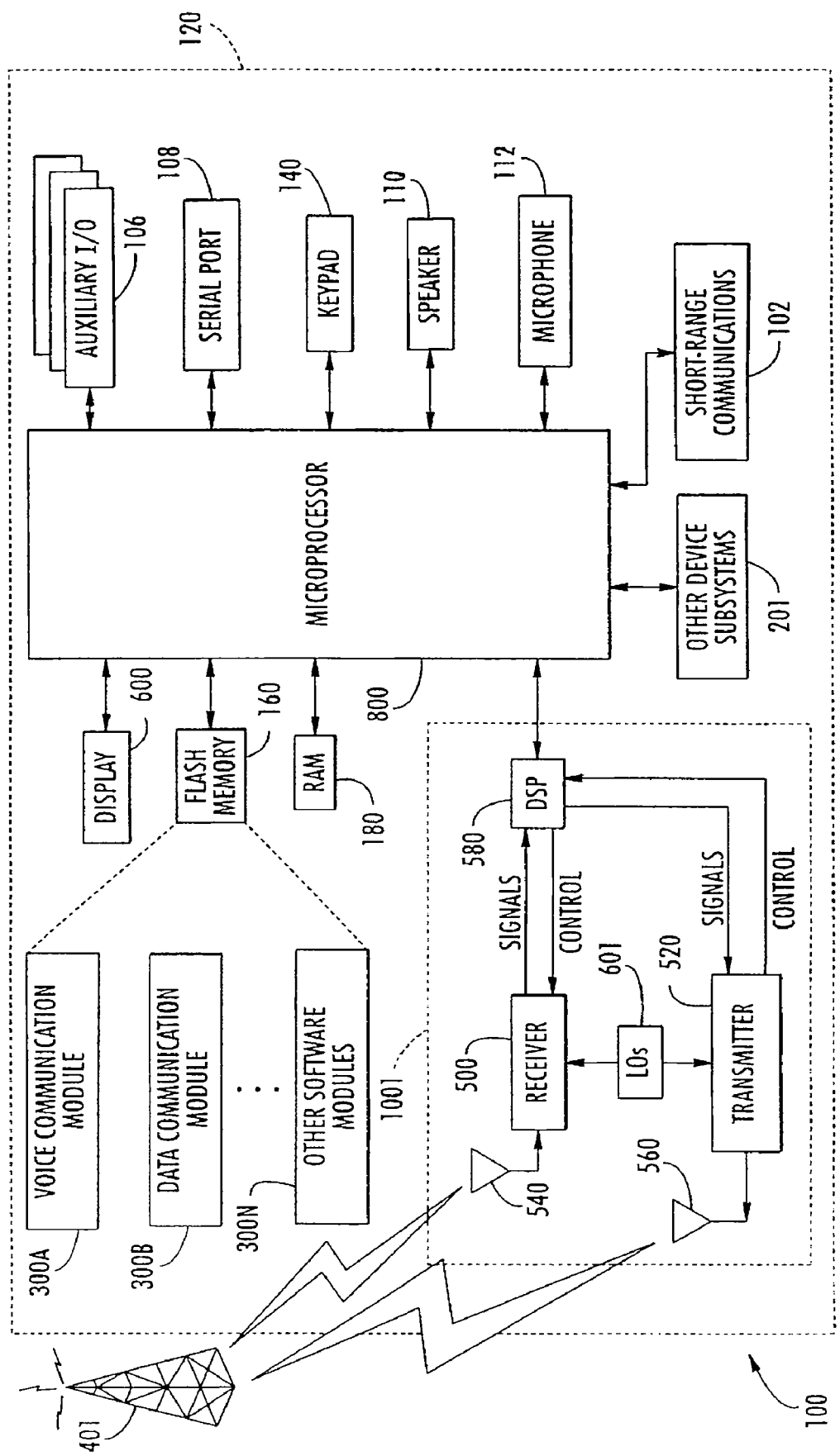
FIG. 6 is a schematic block diagram of an exemplary mobile wireless communications device for use with the disclosed and claimed concept.

In addition to the processing device 800, other parts of the mobile device 100 are shown schematically in FIG. 6. These include a communications subsystem 1001; a short-range communications subsystem 102; the keyboard 400 and the display 600, along with other input/output devices 106, 108, 110 and 112; as well as memory devices 160, 180 and various other device subsystems 201. The mobile device 100 is preferably a two-way RF communications device having voice and data communications capabilities. In addition, the mobile device 100 preferably has the capability to communicate with other computer systems via the Internet.

Operating system software executed by the processing device 800 is preferably stored in a persistent store, such as the flash memory 160, but may be stored in other types of memory devices, such as a read only memory (ROM) or similar storage element. In addition, system software, specific device applications, or parts thereof, may be temporarily loaded into a volatile store, such as the random access memory (RAM) 180. Communications signals received by the mobile device may also be stored in the RAM 180.

The processing device 800, in addition to its operating system functions, enables execution of software applications 300A-300N on the device 100. A predetermined set of applications that control basic device operations, such as data and voice communications 300A and 300B, may be installed on the device 100 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 401. Preferably, the PIM data items are seamlessly integrated, synchronized and updated via the wireless network 401 with the device user's corresponding data items stored or associated with a host computer system.

Communication functions, including data and voice communications, are performed through the communications subsystem 1001, and possibly through the short-range communications subsystem. The communications subsystem 1001 includes a receiver 500, a transmitter 520, and one or more antennas 540 and 560. In addition, the communications subsystem 1001 also includes a processing module, such as a digital signal processor (DSP) 580, and local oscillators (LOs) 601. The specific design and implementation of the communications subsystem 1001 is dependent upon the communications network in which the mobile device 100 is intended to operate. For example, a mobile device 100 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 100 may send and receive communications signals over the communication network 401. Signals received from the communications network 401 by the antenna 540 are routed to the receiver 500, which provides for signal amplification, frequency down conversion, filtering, channel selection, etc., and may also provide analog to digital conversion. Analog-to-digital conversion of the received signal allows the DSP 580 to perform more complex communications functions, such as demodulation and decoding. In a similar manner, signals to be transmitted to the network 401 are processed (e.g. modulated and encoded) by the DSP 580 and are then provided to the transmitter 520 for digital to analog conversion, frequency up conversion, filtering, amplification and transmission to the communication network 401 (or networks) via the antenna 560.

In addition to processing communications signals, the DSP 580 provides for control of the receiver 500 and the transmitter 520. For example, gains applied to communications signals in the receiver 500 and transmitter 520 may be adaptively controlled through automatic gain control algorithms implemented in the DSP 580.

In a data communications mode, a received signal, such as a text message or web page download, is processed by the communications subsystem 1001 and is input to the processing device 800. The received signal is then further processed by the processing device 800 for an output to the display 600, or alternatively to some other auxiliary I/O device 060. A device user may also compose data items, such as e-mail messages, using the keyboard 400 and/or some other auxiliary I/O device 106, such as a touchpad, a rocker switch, a thumb-wheel, or some other type of input device. The composed data items may then be transmitted over the communications network 401 via the communications subsystem 1001.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 600 may also be utilized in voice communications mode, for example to display the identity of a calling party, the duration of a voice call, or other voice call related information.

The short-range communications subsystem enables communication between the mobile device 100 and other proximate systems or devices, which need not necessarily be similar devices. For example, the short-range communications subsystem may include an infrared device and associated circuits and components, or a Bluetooth™ communications module to provide for communication with similarly-enabled systems and devices.

An improved handheld electronic device 1004 in accordance with another embodiment of the disclosed and claimed concept is depicted generally in FIG. 7. As a general matter, the handheld electronic device 1004 is substantially identical in configuration and function to the mobile wireless communications device 20, except that the handheld electronic device 1004 employs a multiple-axis input device instead of or in addition to the scroll wheel 37. In the depicted exemplary embodiment, the multiple-axis input device is a track ball 1032 as will be described below. It is noted, however, that multiple-axis input devices other than the track ball 1032 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The handheld electronic device 1004 includes a housing 1006 upon which is disposed a processor unit that includes an input apparatus 1008, an output apparatus 1012, a processor 1016, a memory 1020, and a number of routines 1022. All of the operations that can be performed on or with the mobile wireless communications device 20 can be performed on or with the handheld electronic device 1004. As such, the features of the mobile wireless communications device 20 that are common with the handheld electronic device 1004, and this would comprise essentially all of the features of the mobile wireless communications device 20, will generally not be repeated.

The output apparatus 1012 includes a display 1060 that provides visual output. The exemplary output in FIG. 7 is a plurality of icons 1062 that are selectable by the user for the purpose of, for example, initiating the execution on the processor 1016 of a routine 1022 that is represented by an icon 1062.

The input apparatus 1008 can be said to comprise a keypad 1024 and the track ball 1032, all of which serve as input members. The keypad 1024 and the track ball 1032 are advantageously disposed adjacent one another. The keypad 1024 comprises a plurality of keys 1028 that are actuatable to provide input to the processor 1016. Many of the keys 1028 have assigned thereto a plurality of linguistic elements in the exemplary form of Latin letters. Other keys 1028 can have assigned thereto functions and/or other characters.

For instance, one of the keys 1028 is an <ESCAPE> key 1031 which, when actuated, provides to the processor 1016 an input that undoes the action which resulted from the immediately preceding input and/or moves the user to a logically higher position within the logical menu tree managed by a graphical user interface (GUI) routine 1022. The function provided by the <ESCAPE> key 1031 can be used at any logical location within any portion of the logical menu tree except, perhaps, at a home screen such as is depicted in FIG. 7. The <ESCAPE> key 1031 is advantageously disposed adjacent the track ball 1032 thereby enabling, for example, an unintended or incorrect input from the track ball 1032 to be quickly undone, i.e., reversed, by an actuation of the adjacent <ESCAPE> key 1031.

Another of the keys 1028 is a <MENU> key 1033 which, when actuated, provides to the processor 1016 an input that causes the GUI 1022 to generate and output on the display 1060 a menu that is appropriate to the user's current logical location within the logical menu tree. For instance, FIG. 8 depicts an exemplary menu 1035A that would be appropriate if the user's current logical location within the logical menu tree was viewing an email within an email routine 1022. That is, the menu 1035A provides selectable options that would be appropriate for a user given that the user is, for example, viewing an email within an email routine 1022. In a similar fashion, FIG. 9 depicts another exemplary menu 1035B that would be depicted if the user's current logical location within the logical menu tree was within a telephone routine 1022.

The track ball 1032 is disposed on the housing 1006 and is freely rotatable in all directions with respect to the housing 1006. A rotation of the track ball 1032 a predetermined rotational distance with respect to the housing 1006 provides an input to the processor 1016, and such inputs can be employed by the routines 1022, for example, as navigational inputs, scrolling inputs, selection inputs, and other inputs.

For instance, the track ball 1032 is rotatable about a horizontal axis 1034A to provide vertical scrolling, navigational, selection, or other inputs. Similarly, the track ball 1032 is rotatable about a vertical axis 1034B to provide horizontal scrolling, navigational, selection, or other inputs. Since the track ball 1032 is freely rotatable with respect to the housing 1006, the track ball 1032 is additionally rotatable about any other axis (not expressly depicted herein) that lies within the plane of the page of FIG. 7 or that extends out of the plane of the page of FIG. 7.

The track ball 1032 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 1032 is merely one of many multiple-axis input devices that could be employed on the handheld electronic device 1004. As such, mechanical alternatives to the track ball 1032, such as a joystick, might have a limited rotation with respect to the housing 1006, and non-mechanical alternatives might be immovable with respect to the housing 1006, yet all are capable of providing input in a plurality of directions or along a plurality of axes.

The track ball 1032 additionally is translatable toward the housing 1006, i.e., into the plane of the page of FIG. 7, to provide additional inputs. The track ball 1032 could be translated in such a fashion by, for example, a user applying an actuating force to the track ball 1032 in a direction toward the housing 1006, such as by pressing on the track ball 1032. The inputs that are provided to the processor 1016 as a result of a translation of the track ball 1032 in the indicated fashion can be employed by the routines 1022, for example, as selection inputs, delimiter inputs, or other inputs.

The track ball 1032 is rotatable to provide, for example, navigational inputs among the icons 1062. For example, FIG. 7 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 1060, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 1004. Whenever an icon 1062 or other selectable object is the subject of the selection focus, a selection input to the processor 1016 will result in the routine 1022 or other function represented by the icon 1062 or other selectable object to be executed or initiated.

The movement of the indicator 1066 from the icon 1062A, as indicated with the indicator 1066A, to the icon 1062B, as is indicated by the indicator 1066B, was accomplished by rotating the track ball 1032 about the vertical axis 1034B to provide a horizontal navigational input. As mentioned above, a rotation of the track ball 1032 a predetermined rotational distance results in an input to the processor 1016. In the present example, the track ball 1032 would have been rotated about the vertical axis 1034B a rotational distance equal to three times the predetermined rotational distance since the icon 1062B is disposed three icons 1062 to the right the icon 1062A. Such rotation of the track ball 1032 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 1032 about the horizontal axis 1034A to provide a vertical navigational input. In so doing, the track ball 1032 would have been rotated a rotational distance equal to two times the predetermined rotational distance since the icon 1062C is disposed two icons 1062 below the icon 1062B. Such rotation of the track ball 1032 likely would have been made in a single motion by the user, but this need not necessarily be the case.

It thus can be seen that the track ball 1032 is rotatable in various directions to provide various navigational and other inputs to the processor 1016. Rotational inputs by the track ball 1032 typically are interpreted by whichever routine 1022 is active on the handheld electronic device 1004 as inputs that can be employed by such routine 1022. For example, the GUI 1022 that is active on the handheld electronic device 1004 in FIG. 7 requires vertical and horizontal navigational inputs to move the indicator 1066, and thus the selection focus, among the icons 1062. If a user rotated the track ball 1032 about an axis oblique to the horizontal axis 1034A and the vertical axis 1034B, the GUI 1022 likely would resolve such an oblique rotation of the track ball 1032 into vertical and horizontal components which could then be interpreted by the GUI 1022 as vertical and horizontal navigational movements, respectively. In such a situation, if one of the resolved vertical and horizontal navigational movements is of a greater magnitude than the other, the resolved navigational movement having the greater magnitude would be employed by the GUI 1022 as a navigational input in that direction to move the indicator 1066 and the selection focus, and the other resolved navigational movement would be ignored by the GUI 1022, for example.

When the indicator 1066 is disposed on the icon 1062C, as is indicated by the indicator 1066C, the selection focus of the handheld electronic device 1004 is on the icon 1062C. As such, a translation of the track ball 1032 toward the housing 1006 as described above would provide an input to the processor 1016 that would be interpreted by the GUI 1022 as a selection input with respect to the icon 1062C. In response to such a selection input, the processor 1016 would, for example, begin to execute a routine 1022 that is represented by the icon 1062C. It thus can be understood that the track ball 1032 is rotatable to provide navigational and other inputs in multiple directions, assuming that the routine 1022 that is currently active on the handheld electronic device 1004 can employ such navigational or other inputs in a plurality of directions, and can also be translated to provide a selection input or other input.

Rotational movement inputs from the track ball 1032 could be employed to navigate among, for example, the menus 1035A and 1035B. For instance, after an actuation of the <MENU> key 1033 and an outputting by the GUI 1022 of a resultant menu, the user could rotate the track ball 1032 to provide scrolling inputs to successively highlight the various selectable options within the menu. Once the desired selectable option is highlighted, i.e., is the subject of the selection focus, the user could translate the track ball 1032 toward the housing 1006 to provide a selection input as to the highlighted selectable option. In this regard, it is noted that the <MENU> key 1033 is advantageously disposed adjacent the track ball 1032. This enables, for instance, the generation of a menu by an actuation the <MENU> key 1033, conveniently followed by a rotation the track ball 1032 to highlight a desired selectable option, for instance, followed by a translation of the track ball 1032 toward the housing 1006 to provide a selection input to initiate the operation represented by the highlighted selectable option.

It is further noted that one of the additional inputs that can be provided by a translation of the track ball 1032 is an input that causes the GUI 1022 to output a reduced menu. For instance, a translation of the track ball 1032 toward the housing 1066 could result in the generation and output of a more limited version of a menu than would have been generated if the <MENU> key 1033 had instead been actuated. Such a reduced menu would therefore be appropriate to the user's current logical location within the logical menu tree and would provide those selectable options which the user would have a high likelihood of selecting. Rotational movements of the track ball 1032 could provide scrolling inputs to scroll among the selectable options within the reduced menu 1035C, and translation movements of the track ball 1032 could provide selection inputs to initiate whatever function is represented by the selectable option within the reduce menu 1032 that is currently highlighted.

By way of example, if instead of actuating the <MENU> key 1033 to generate the menu 1035A the user translated the track ball 1032, the GUI 1022 would generate and output on the display the reduced menu 1035C that is depicted generally in FIG. 10. The exemplary reduced menu 1035C provides as selectable options a number of the selectable options from the menu 1035A that the user would be most likely to select. As such, a user seeking to perform a relatively routine function could, instead of actuating the <MENU> key 1033 to display the full menu 1035A, translate the track ball 1032 to generate and output the reduced menu 1035C. The user could then conveniently rotate the track ball 1032 to provide scrolling inputs to highlight a desired selectable option, and could then translate the track ball 1032 to provide a selection input which would initiate the function represented by the selectable option in the reduced menu 1035C that is currently highlighted.

In the present exemplary embodiment, many of the menus that could be generated as a result of an actuation of the <MENU> key 1033 could instead be generated and output in reduced form as a reduced menu in response to a translation of the track ball 1032 toward the housing 1006. It is noted, however, that a reduced menu might not be available for each full menu that could be generated from an actuation of the <MENU> key 1033. Depending upon the user's specific logical location within the logical menu tree, a translation of the track ball 1032 might be interpreted as a selection input rather than an input seeking a reduced menu. For instance, a translation of the track ball 1032 on the home screen depicted in FIG. 7 would result in a selection input as to whichever of the icons 1062 is the subject of the input focus. If the <MENU> key 1033 was actuated on the home screen, the GUI 1022 would output a menu appropriate to the home screen, such as a full menu of all of the functions that are available on the handheld electronic device 1004, including those that might not be represented by icons 1062 on the home screen.

Figure 11:
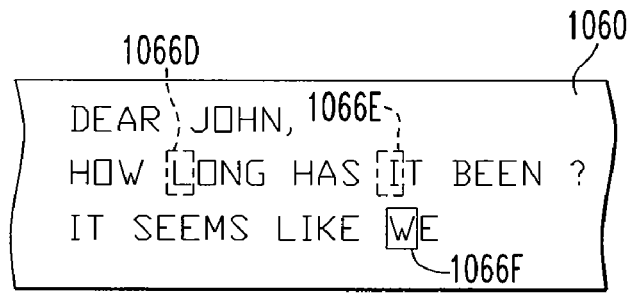
FIG. 11 is an exemplary output such as could occur during a text entry or text editing operation.

FIG. 11 depicts a quantity of text that is output on the display 1060, such as during a text entry operation or during a text editing operation, for example. The indicator 1066 is depicted in FIG. 11 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 7, the cursor 1066 was moved among the letters "L", "I", and "W" through the use of horizontal and vertical navigational inputs resulting from rotations of the track ball 1032. In the example of FIG. 11, however, each rotation of the track ball 1032 the predetermined rotational distance would move the indicator 1066 to the next adjacent letter. As such, in moving the indicator 1066 between the letters "L" and "I," the user would have rotated the track ball 1032 about the vertical axis 1034B a rotational distance equal to nine times the predetermined rotational distance, for example, since "I" is disposed nine letters to the right of "L".

Figure 12:
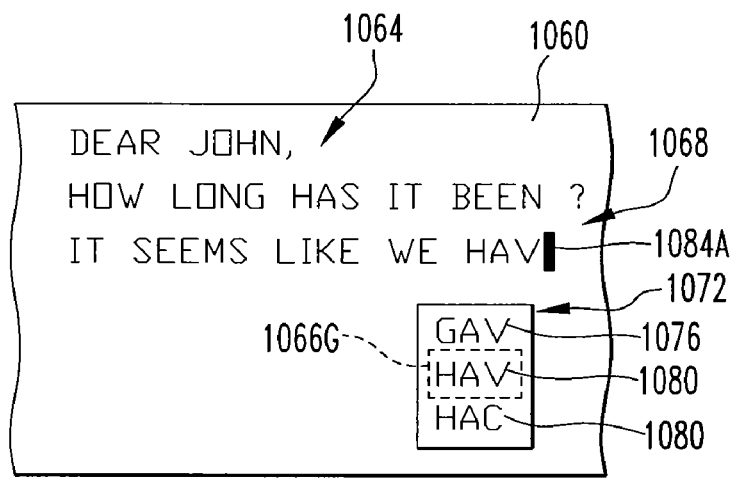
FIG. 12 is an exemplary output during a text entry operation.

FIG. 12 depicts an output 1064 on the display 1060 during, for example, a text entry operation that employs the disambiguation routine 1022. The output 1064 can be said to comprise a text component 1068 and a variant component 1072. The variant component 1072 comprises a default portion 1076 and a variant portion 1080. FIG. 12 depicts the indicator 1066G on the variant 1080 "HAV", such as would result from a rotation of the track ball 1032 about the horizontal axis 1034A to provide a downward vertical scrolling input. In this regard, it is understood that a rotation of the track ball 1032 a distance equal to the predetermined rotational distance would have moved the indicator 1066 from a position (not expressly depicted herein) disposed on the default portion 1076 to the position disposed on the first variant 1080, as is depicted in FIG. 12. Since such a rotation of the track ball 1032 resulted in the first variant 1080 "HAV" being highlighted with the indicator 1066G, the text component 1068 likewise includes the text "HAV" immediately preceding a cursor 1084A.

Figure 13:
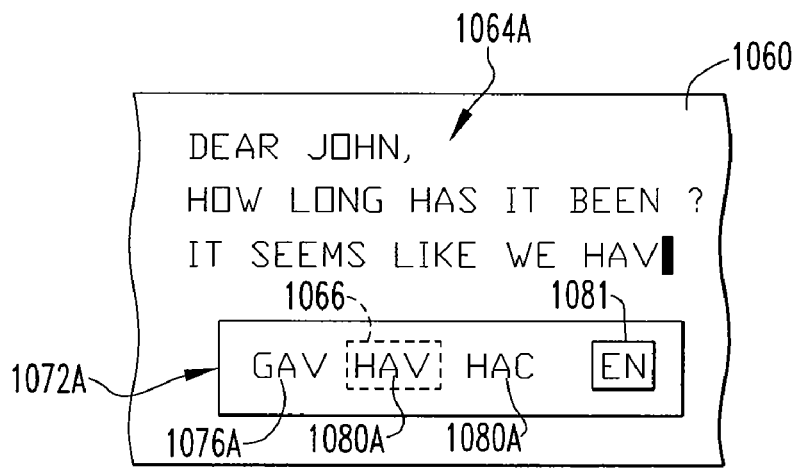
FIG. 13 is an alternative exemplary output during a text entry operation.

FIG. 13 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 1032 the predetermined rotational distance about the vertical axis 1034B. This is to be contrasted with the variant component 1072 of FIG. 12 wherein the default portion 1076 and the variants 1080 are vertically arranged, and which can be sequentially selected by the user through the user of vertical scrolling inputs with the track ball 1032.

In this regard, it can be understood that the track ball 1032 can provide both the vertical scrolling inputs employed in conjunction with the output 1064 as well as the horizontal scrolling inputs employed in conjunction with the output 1064A. For instance, the disambiguation routine 1022 potentially could allow the user to customize the operation thereof by electing between the vertically arranged variant component 1072 and the horizontally arranged variant component 1072A. The track ball 1032 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 1032 can be rotated about the horizontal axis 1034A to provide the vertical scrolling inputs employed in conjunction with the variant component 1072, and also can be rotated about the vertical axis 1034B to provide the horizontal scrolling inputs that are employed in conjunction with the variant component 1064A. The track ball 1032 thus could provide appropriate navigational, strolling, selection, and other inputs depending upon the needs of the routine 1022 active at any time on the handheld electronic device 1004. The track ball 1032 enables such navigational, strolling, selection, and other inputs to be intuitively generated by the user through rotations of the track ball 1032 in directions appropriate to the active routine 1022, such as might be indicated on the display 1060. Other examples will be apparent.

It can further be seen from FIG. 13 that the variant component 1072A additionally includes a value 1081 that is indicative of the language into which the disambiguation routine 1022 will interpret ambiguous text input. In the example depicted in FIG. 13, the language is English.

Figure 14:
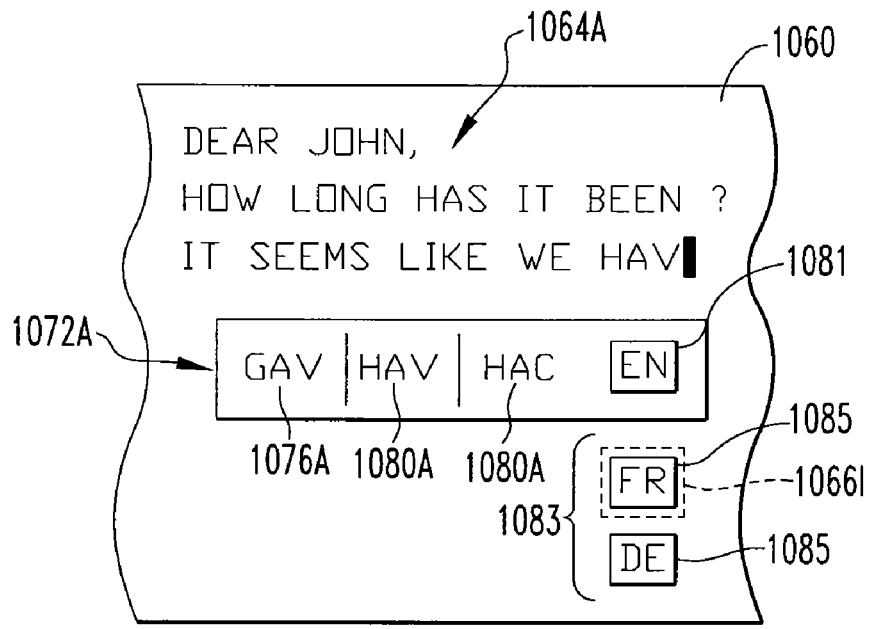
FIG. 14 is another exemplary output during a part of text entry operation.

As can be seen in FIG. 14, the value 1081 can be selected by the user to cause the displaying of a list 1083 of alternative values 1085. The alternative values 1085 are indicative of selectable alternative languages into which the disambiguation routine 1022 can interpret ambiguous input. A selection of the value 1081 would have been achieved, for example, by the user providing horizontal scrolling inputs with the track ball 1032 to cause (not expressly depicted herein) the indicator 1066 to be disposed over the value 1081, and by thereafter translating the track ball 1032 toward the housing 1006 to provide a selection input.

The alternative values 1085 in the list 1083 are vertically arranged with respect to one another and with respect to the value 1081. As such, a vertical scrolling input with the track ball 1032 can result in a vertical movement of the indicator 1066I to a position on one of the alternative values 1085 which, in the present example, is the alternative value 1085 "FR", which is representative of the French language. The alternative value 1085 "FR" could become selected by the user in any of a variety of fashions, such as by actuating the track ball 1032 again, by continuing to enter text, or in other fashions. It thus can be understood from FIG. 13 and FIG. 14 that the track ball 1032 can be rotated to provide horizontal scrolling inputs and, when appropriate, to additionally provide vertical scrolling inputs and, when appropriate, to additionally provide selection inputs, for example.

Figure 15:
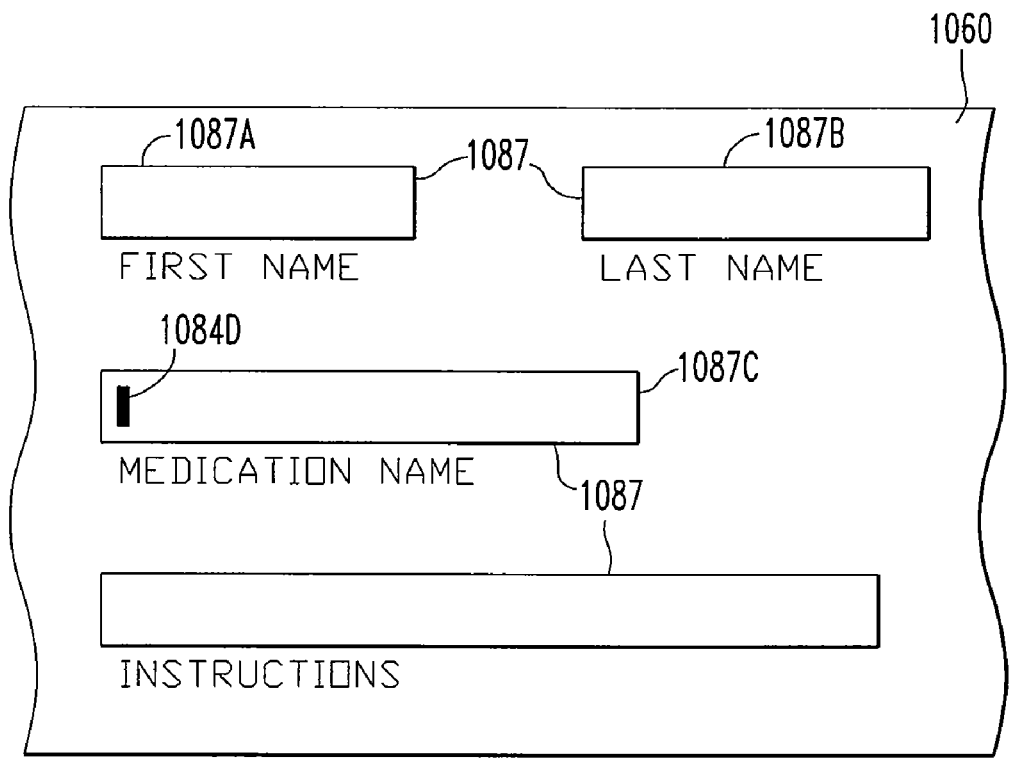
FIG. 15 is an exemplary output during a data entry operation.

FIG. 15 depicts another exemplary output on the display 1060 such as might be employed by a data entry routine 1022. The exemplary output of FIG. 15 comprises a plurality of input fields 1087 with corresponding descriptions. A cursor 1084D, when disposed within one of the input fields 1087, indicates to the user that an input focus of the handheld electronic device 1004 is on that input field 1087. That is, data such as text, numbers, symbols, and the like, will be entered into whichever input field 1087 is active, i.e., is the subject of the input focus. It is understood that the handheld electronic device 1004 might perform other operations or take other actions depending upon which input field 1087 is the subject of the input focus.

Navigational inputs from the track ball 1032 advantageously enable the cursor 1084D, and thus the input focus, to be switched, i.e., shifted, among the various input fields 1087. For example, the input fields 1087 could include the input fields 1087A, 1087B, and 1087C. FIG. 15 depicts the cursor 1084D as being disposed in the input field 1087C, indicating that the input field 1087C is the subject of the input focus of the handheld electronic device 1004. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 1032. That is, the track ball 1032 would be rotated the predetermined rotational distance about the horizontal axis 1034. Similarly, the cursor 1084D, and thus the input focus, can be shifted from the input field 1087A to the input field 1087B, which is disposed adjacent and to the right of the input field 1087A, by providing a horizontal scrolling input to the right with the track ball 1032. That is, such a horizontal scrolling input could be provided by rotating the track ball the predetermined rotational distance about the vertical axis 1034B. It thus can be seen that the track ball 1032 is rotatable in a plurality of directions about a plurality axes to provide navigational, scrolling, and other inputs in a plurality of directions among a plurality of input fields 1087. Other types of inputs and/or inputs in other applications will be apparent. Since the keypad 1024 and the track ball 1032 are advantageously disposed adjacent one another, the user can operate the track ball 1032 substantially without moving the user's hands away from the keypad 1024 during a text entry operation or other operation.

Figure 16:
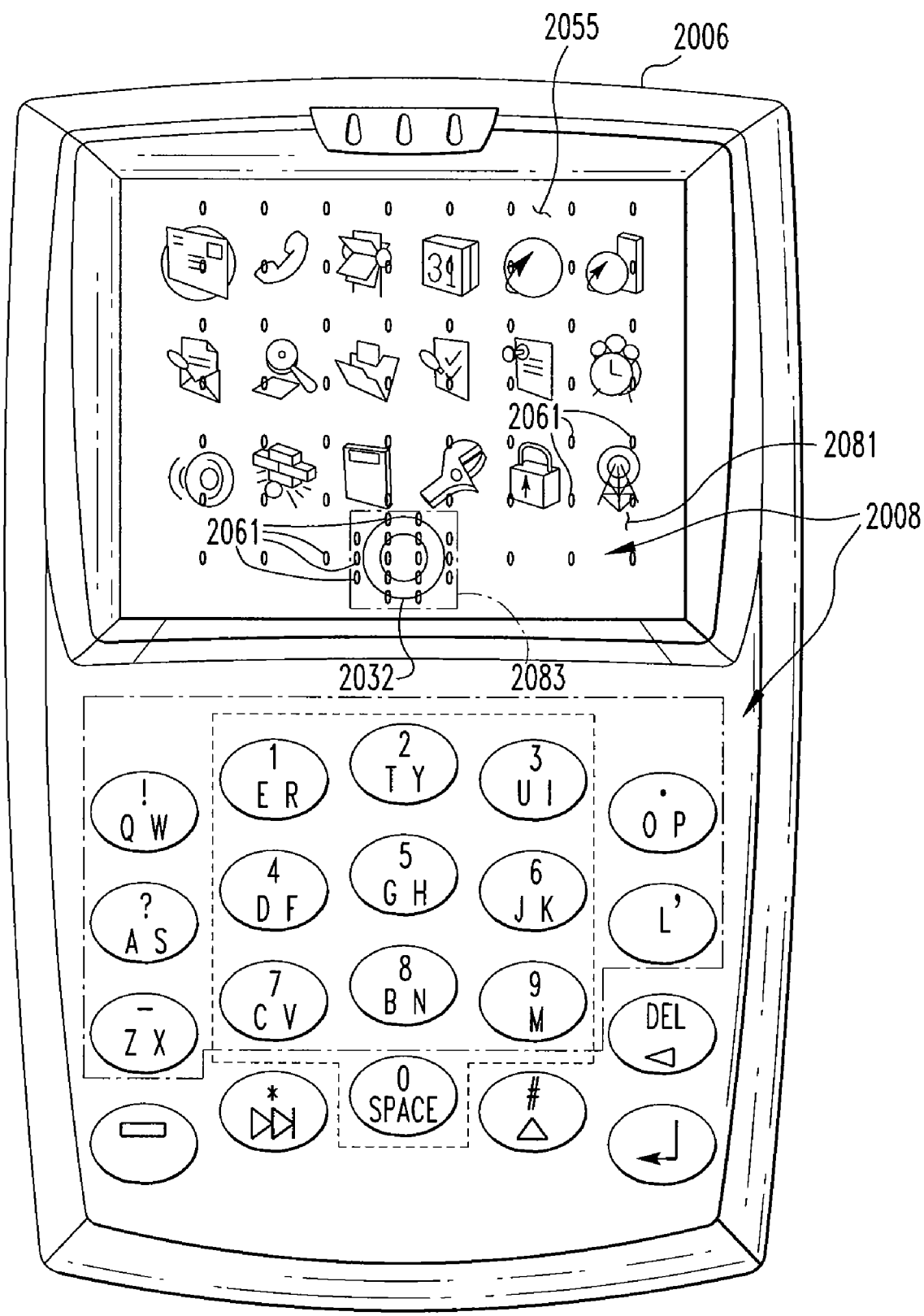
FIG. 16 is a top plan view of an improved handheld electronic device in accordance with still another embodiment of the disclosed and claimed concept.
Figure 17:
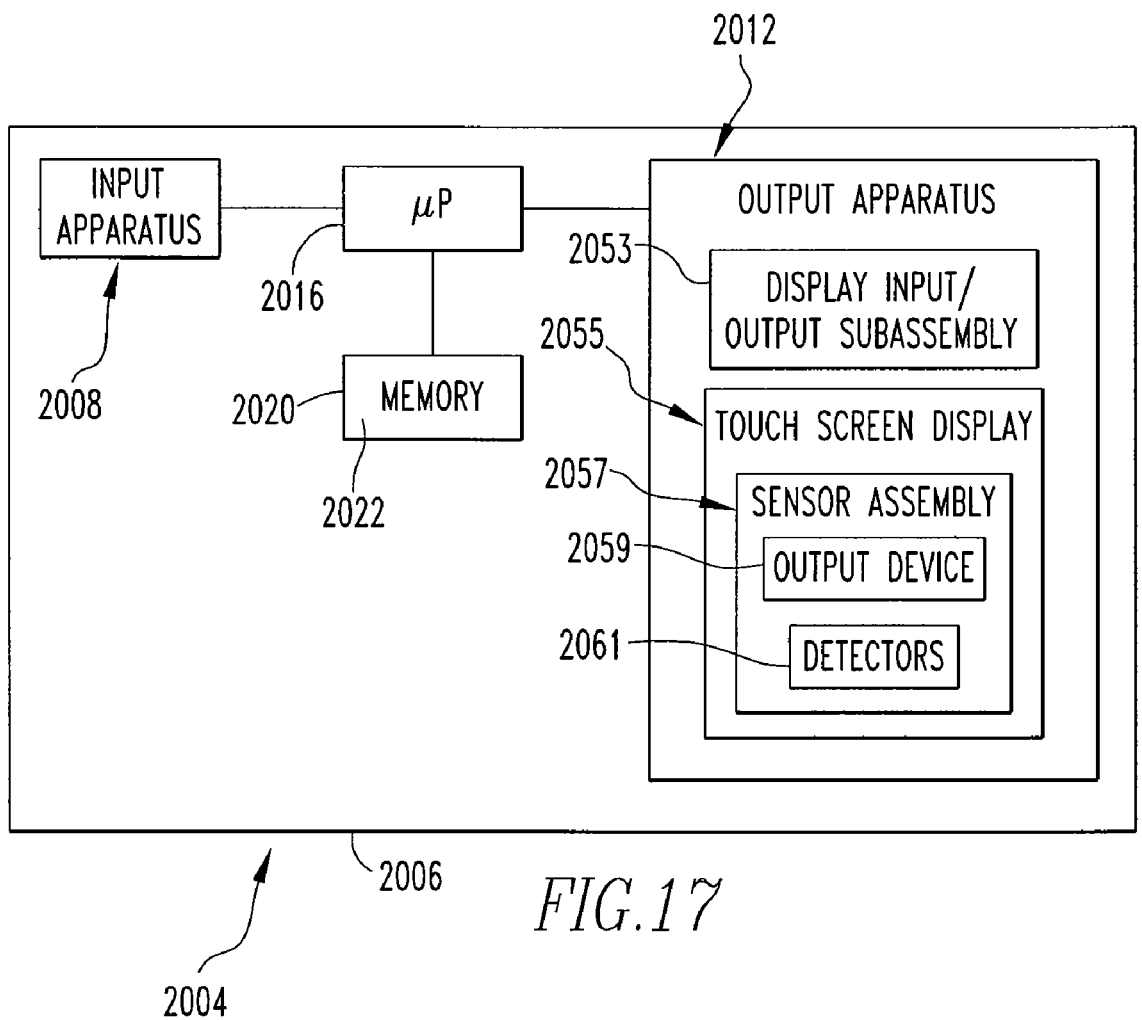
FIG. 17 is a schematic depiction of the improved handheld electronic device of FIG. 16.

An improved handheld electronic device 2004 in accordance with still another embodiment of the disclosed and claimed concept is depicted generally in FIG. 16 and FIG. 17. The handheld electronic device 2004 includes a housing 2006 upon which is disposed a processor unit that includes an input apparatus 2008, an output apparatus 2012, a processor 2016, a memory 2020, and a number of routines 2022. All of the operations that can be performed on or with the mobile wireless communications device 20 or the handheld electronic device 1004 or both can be performed on or with the handheld electronic device 2004. As such, the features of the handheld electronic device 2004 that are common with the mobile wireless communications device 20 or the handheld electronic device 1004 or both, and this would comprise essentially all of the features of the mobile wireless communications device 20 or the handheld electronic device 1004 or both, will generally not be repeated.

As a general matter, the handheld electronic device 2004 is substantially identical in configuration and function to the handheld electronic device 1004, except that the handheld electronic device 2004 includes a touch screen display 2055 that provides a non-mechanical multiple-axis input device 2032 instead of the track ball 1032. The multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 16, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 1032 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 1032 of the handheld electronic device 1004. It is understood that the virtual track ball 2032 is but one example of the many types of multiple-axis input devices that could be employed on the handheld electronic device 2004.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A method of enabling input on a handheld electronic device including a plurality of keys and a memory having a plurality of words stored therein, at least some of the keys each having a plurality of characters assigned thereto, at least one of the keys having a plurality of punctuation symbols assigned thereto, the handheld device having a language option selector configured for selecting, among a plurality of languages, a language for disambiguating ambiguous input, the method comprising:

detecting an ambiguous input including an ambiguous punctuation input;

outputting a first word corresponding with the ambiguous input and comprising a first punctuation symbol of the ambiguous punctuation input and at least one character additional to the ambiguous input;

outputting a second word corresponding with the ambiguous input and comprising a second punctuation symbol of the ambiguous punctuation input;

outputting a third output indicative of a language used to interpret the ambiguous input;

detecting an input comprising a movement input to the third output and a selection input associated with the third output;

outputting one or more additional outputs indicative of one or more additional languages upon detection of the selection input; and detecting a selected language from the one or more additional languages, wherein the selected language is used for disambiguation.

2. The method of claim 1, further comprising detecting as the first word a word followed by an apostrophe punctuation symbol and the letter "S", and detecting as the second word a word followed by a comma.

3. The method of claim 2, further comprising detecting as the first word a word followed by the apostrophe punctuation symbol and in turn followed by the letter "S", and outputting another first word comprising a word followed by the letter "S" and in turn followed by the apostrophe punctuation symbol.

4. A handheld electronic device comprising;

a processor apparatus comprising a processor and a memory having a plurality of words stored therein;

an input apparatus structured to provide input to the processor apparatus and comprising a plurality of input members including a multiple-axis input device and a plurality of keys, at least some of the keys each having a plurality of characters assigned thereto;

an output apparatus structured to receive output signals from the processor apparatus;

a language option selector configured for selecting, among a plurality of languages, a language for disambiguating ambiguous input;

the memory further having stored therein a number of routines which, when executed on the processor, cause the handheld electronic device to perform operations comprising:

detecting an ambiguous input including an ambiguous punctuation input;

outputting a first word corresponding with the ambiguous input and comprising a first punctuation symbol of the ambiguous punctuation input and at least one character additional to the ambiguous input;

outputting a second word corresponding with the ambiguous input and comprising a second punctuation symbol of the ambiguous punctuation input;

outputting a third output indicative of a language used to interpret the ambiguous input;

detecting an input comprising a movement input to the third output and a selection input associated with the third output;

outputting one or more additional outputs indicative of one or more additional languages upon detection of the selection input; and detecting a selected language from the one or more additional languages, wherein the selected language is used for disambiguation.

5. The handheld electronic device of claim 4 wherein the operations further comprise detecting as the first word a word followed by an apostrophe punctuation symbol and the letter "S", and detecting as the second word a word followed by a comma.

6. The handheld electronic device of claim 5 wherein the operations further comprise detecting as the first word a word followed by the apostrophe punctuation symbol and in turn followed by the letter "S", and outputting another first word comprising a word followed by the letter "S" and in turn followed by the apostrophe punctuation symbol.

7. The handheld electronic device of claim 5 wherein the multiple-axis input device comprises one of: a track ball, a touch pad, and a joystick.

8. The handheld electronic device of claim 5 wherein one of the plurality of keys is an <ESCAPE> key disposed adjacent the multiple-axis input device and which when actuated provides to the processor an input that undoes the input from the multiple-axis input device.

9. The method of claim 1, wherein the multiple-axis input device is a rotational multiple-axis input device.

10. The method of claim 9, wherein the rotational multiple-axis input device is capable of navigating a display screen directly horizontally.

11. The method of claim 1, wherein the multiple-axis input device is a computer-simulated trackball.

12. The handheld electronic device of claim 5, wherein the multiple-axis input device is a rotational multiple-axis input device.

13. The handheld electronic device of claim 12, wherein the rotational multiple-axis input device is capable of navigating a display screen directly horizontally.

14. The handheld electronic device of claim 5, wherein the multiple-axis input device is a computer-simulated trackball.

* * * * *

UNITED STATES PATENT AND TRADEMARK OFFICE
CERTIFICATE OF CORRECTION

| | | |
|---|---|---|
| PATENT NO. | : 8,289,193 B2 | |
| APPLICATION NO. | : 11/849003 | |
| DATED | : October 16, 2012 | |
| INVENTOR(S) | : Sherryl Lee Lorraine Scott | |

It is certified that error appears in the above-identified patent and that said Letters Patent is hereby corrected as shown below:

In the Specification:

In column 2, line 20, "at least one choices" should read --at least one choice--.

In column 3, line 61, "enter a "W." she" should read --enter a "W," she--.

In column 4, line 66, "("her's" or "hers")" should read --("her's" or "hers"')--.

In column 5, lines 51-52, "word form the menu" should read --word from the menu--.

In column 6, lines 4-5, "in accordance the present invention" should read --in accordance with the present invention--.

In column 7, line 47, "I/O device 060." should read --I/O device 106.--.

In column 10, line 14, "right the icon" should read --right of the icon--.

In column 11, line 14, "actuation the <MENU> key" should read --actuation of the <MENU> key--.

In column 11, line 15, "rotation the track ball" should read --rotation of the track ball--.

In column 11, lines 35-36, "reduce menu 1032" should read --reduced menu 1035C--.

In column 12, line 43, "FIG. 13 depict" should read --FIG. 13 depicts--.

In column 12, line 55, "through the user" should read --through the use--.

In column 13, lines 7-8, "variant component 1064A." should read --variant component 1072A.--.

In column 13, line 9, "strolling," should read --scrolling,--.

In column 13, line 12, "strolling," should read --scrolling,--.

In column 14, lines 7-8, "horizontal axis 1034." should read --horizontal axis 1034A.--.

In column 14, line 16, "plurality axes" should read --plurality of axes--.

In column 15, line 31, "Thus, and any pixel" should read --Thus, any pixel--.

In column 15, line 41, "display 2005" should read --display 2055--.

Signed and Sealed this
Eighth Day of January, 2013

David J. Kappos
*Director of the United States Patent and Trademark Office*

In the Claims:

In claim 4, column 17, line 29, "comprising;" should read --comprising:--.